United States Patent [19]

Regan et al.

[11] Patent Number: 4,578,330

[45] Date of Patent: Mar. 25, 1986

[54] HYDROXYALUMINUMPHTHALOCYA-NINE HAVING REDUCED GREEN ABSORPTION

[75] Inventors: Michael T. Regan, Fairport; Hal E. Wright, Rochester, both of N.Y.

[73] Assignee: Eastman Kodak Company, Rochester, N.Y.

[21] Appl. No.: 674,655

[22] PCT Filed: Jun. 18, 1984

[86] PCT No.: PCT/US84/00922

§ 371 Date: Nov. 16, 1984

§ 102(e) Date: Nov. 16, 1984

[87] PCT Pub. No.: WO85/00440

PCT Pub. Date: Jan. 31, 1985

[51] Int. Cl.$^4$ ............................................. G03G 5/06
[52] U.S. Cl. ........................................ 430/37; 430/78; 430/106; 260/245.86; 260/245.87
[58] Field of Search .................... 430/37, 106, 78; 260/245.86, 245.87

[56] References Cited

U.S. PATENT DOCUMENTS

| | | | |
|---|---|---|---|
| 2,540,775 | 2/1951 | Broulliard et al. | 260/245.87 |
| 3,004,986 | 10/1961 | Kirby et al. | 260/314.5 |
| 3,523,030 | 8/1970 | Mallin et al. | 260/245.87 |
| 3,615,558 | 10/1971 | Larreira et al. | 260/245.86 X |
| 4,239,685 | 12/1980 | Pigasse | 260/245.87 |
| 4,311,775 | 1/1982 | Regan | 430/37 |
| 4,471,039 | 9/1984 | Borsenberger et al. | 260/245.87 X |

OTHER PUBLICATIONS

Chemical Abstracts, vol. 80, 1974 (Columbus, Ohio, U.S.) V. A. Shorin et al.: "Synthesis of aluminum phthalocyanines substituted at the metal and study of their optical and electrical characteristics", see p. 74, Abstract No. 97325x, Izv. Vyssh. Ucheb. Zaved., Khim. Khim. Tekhnol. 1973, 16(12), 1904–1908 (Russ.).

Primary Examiner—Roland E. Martin
Attorney, Agent, or Firm—David F. Janci

[57] ABSTRACT

An hydroxyaluminumphthalocyanine colorant compound with reduced green absorption having peak absorption bathochromically shifted to 621 nm is disclosed. In a preferred embodiment, hydroxyaluminumphthalocyanine of the invention exhibits reduced absorption on both sides of the 621-nm peak as determined by the peak width at half maximum intensity. Hydroxyaluminumphthalocyanine is useful as an electrically photosensitive component in photoelectrophoretic imaging processes, as well as in electrographic developers as a toner constituent.

7 Claims, No Drawings

HYDROXYALUMINUMPHTHALOCYANINE HAVING REDUCED GREEN ABSORPTION

The present invention relates to hydroxyaluminumphthalocyanine colorant compounds. These compounds are useful in photoelectrophoretic imaging materials and as electrographic toner constituents.

In various imaging systems, such as photoelectrophoretic (PEP) imaging systems, photosensitive colorants are employed to provide light sensitivity, as well as faithful reproduction of the light regions to which the colorants are sensitive. In PEP systems, colorants employed are electrically photosensitive and are selected from a variety of material classes such a phthalocyanine pigments. One of these, cyan-colored hydroxyoaluminum phthalocyanine, is particularly useful for the degree of electrical photosensitivity or speed it provides. However, its coloration is not crisp, and its peak absorption at 612 nm (as determined herein) constitutes undesirable absorption in the green spectral region. Thus, when hydroxyaluminumphthalocyanine is employed in imaging applications with magenta colorants, poor color separation results.

It is an object of the present invention to provide hydroxyaluminumphthalocyanine which exhibits improved color separation. This object has been achieved with a novel crystalline form of hydroxyaluminumphthalocyanine which has an absorption peak at 621 nm as determined herein. The present hydroxyaluminumphthalocyanine, furthermore, has a peak width of no more than 100 nm at half maximum intensity at the 621-nm peak.

Among other uses such as in paints or inks, the hydroxyaluminumphthalocyanines of the present invention are electrically photosensitive and thus suited for use in photoelectrophoretic (PEP) dispersions, elements and processes associated with such dispersions. A PEP dispersion comprises a plurality of particles composed of the present hydroxyaluminumphthalocyanine dispersed in an electrically insulating, liquefiable or liquid carrier. Hydroxyaluminumphthalocyanine colorants of the present invention are also useful as toner constituents in dry or liquid electrographic developers.

The present invention provides a novel crystalline form of hydroxyaluminumphthalocyanine. In this regard, hydroxyaluminumphthalocyanine has the following structure:

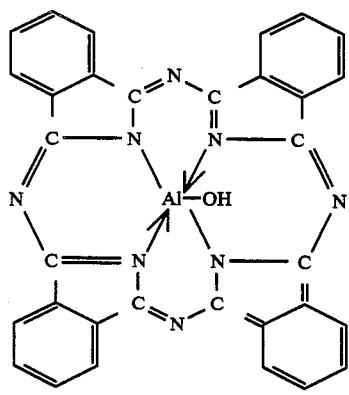

The new crystalline form, as noted above, exhibits an absorption peak at 621 nm which represents a bathochromic shift from the 612 nm absorption peak of prior forms of hydroxyaluminumphthalocyanine. The absorption peak, moreover, is conveniently measured when the hydroxyaluminumphthalocyanine is dispersed in a reference matrix as set forth in greater detail below.

Hydroxyaluminumphthalocyanine having the above-defined spectral absorption characteristics can be prepared by treating hydroxyaluminumphthalocyanine with piperidine or certain other organic liquids at temperatures extending from room temperature (20° C.) to the refluxing temperature of the solvent, or 100° C., whichever is less, as shown in the following examples.

In connection with the spectral absorption of the hydroxyaluminumphthalocyanine compounds in these examples, 1 gram of the isolated hydroxyaluminumphthalocyanine was milled for 5 days in a 7 percent, by weight, solution of poly(vinyltoluene-co-lauryl methacrylate-co-lithium methacrylate-co-methacrylic acid) in Solvesso 100 TM. One volume part of the milled solution was combined with ten volume parts of an Isopar G TM (an isoparaffinic hydrocarbon liquid) solution containing 40 percent, by weight, of the binder Piccotex 100 TM (a trademark for a copolymer of α-methylstyrene and vinyltoluene from Pennsylvania Chemical Corp.) to form a dispersion. The dispersion was hand-coated on the top layer of a reflective support containing, in sequence, a polyester substrate, a polyurethane layer containing dispersed titanium dioxide, and a cellulose acetate top layer. Absorption measurements, in the reflection mode, were made of the hand-coated hydroxyaluminumphthalocyanine-containing layer. The absorption measurement performed on the present novel crystalline form of hydroxyaluminumphthalocyanine in a reference matrix on a reflective support represents an identifying characteristic of the novel crystalline form per se.

EXAMPLE 1

Synthesis and Treatment of Hydroxyaluminumphthalocyanine

Crude hydroxyaluminumphthalocyanine (HAP) was synthesized according to U.S. Pat. Nos. 2,647,127 and 2,673,854. The crude product was acid-treated according to the following procedure:

Chemicals
- 400 gm (7.2 ×10$^{-2}$ M) crude hydroxyaluminumphthalocyanine
- 400 ml Reagent ACS sulfuric acid, Fisher Scientific Co. (specific gravity 1.83)
- 2600 gm ice 1300 gm distilled water 800 ml Reagent ACS ammonium hydroxide, Fisher Scientific Co.

Crude hydroxyaluminumphthalocyanine was ground with a mortar and pestle, slowly added to the acid which was vigorously stirred for 1.5 hr after addition was completed. The brown solution was filtered through a 1-liter medium sintered glass funnel. The filtrate was precipitated by pumping it at 400 ml/min into a mixture of 2600 gm of ice and 1300 gm of distilled water with rapid stirring for 10 min. The green solid precipitate was isolated by filtration through a 2-liter medium sintered glass funnel. The solid was reslurried with 800 ml conc. NH$_4$OH at 70° C. for 30 min. The blue solid was isolated by hot filtration, washed 4 times with 800 ml of distilled water under the same conditions, with the final filtrate being neutral. The solid was vacuum oven-dried at 114° C. for 24 hr, ground with mortar and pestle and dried an additional 24 hr under the same conditions. A blue, purified hydroxyaluminumphthalocyanine was obtained. The spectral abosrption of the purified bydroxyaluminumphthalocyanine was evaluated as above to determine peak absorption and width of the absorption peak at half-maximum intensity.

The purified hydroxyaluminumphthalocyanine was then solvent-treated according to the following procedure:

Chemicals 13 g purified hydroxyaluminumphthalocyanine, molecular weight 556 (0.023 M)

130 ml piperidine, molecular weight 85.15

Purified hydroxyaluminumphthalocyanine was ground with mortar and pestle and refluxed with piperidine for 5 hr in a 250-ml, three-neck, round-bottomed flask fitted with a mechanical stirrer, condenser with nitrogen line and a stopper. The mixture was filtered hot through a base-washed, medium, sintered-glass funnel. The solid was washed twice by reslurrying with 500 ml of ethyl acetate, twice with 500-ml reagent grade acetone, and dried in a vacuum oven at 114° C. A purple solid was obtained. The peak absorption and half-maximum peak width of the solvent-treated hydroxyaluminumphthalocyanine were determined as above and reported in the table.

TABLE

| Material | Peak Spectral Absorption | Absorption Peak Width at Half Maximum Intensity |
| --- | --- | --- |
| purified HAP | 612 nm | >150 nm |
| solvent-treated HAP (invention) | 621 nm | ≅100 nm |

The data indicate that the spectral absorption peak of hydroxyaluminumphthalocyanine of the invention is bathochromically shifted to 621 nm and is sharper, as evidenced by the reduced peak width.

X-ray powder diffraction patterns confirm hydroxyaluminumphthalocyanine of the inventionas being a novel crystalline form of this compound compared with prior-art forms of hydroxyaluminumphthalocyanine. Powder patterns, using Cu K-α radiation, indicate, for example, that hydroxyaluminumphthalocyanine of the invention has peaks at diffraction angles ($2\theta$) of 29.60, 28.78, 27.85, 25.75, 23.85, 22.00, 15.40, 13.80, 11.80, 9.70 and 6.68 degrees. In contrast, the x-ray powder pattern of the acid-treated hydroxyaluminumphthalocyanine (which represents a prior form of the compound) has characteristic peaks at diffraction angles of 34.98, 27.25, 25.20, 20.70, 16.15, 13.70, 13.05 and 6.70 degrees.

Hydroxyaluminumphthalocyanine of the invention, moreover, is distinguished by characteristic infrared spectral patterns. In characterizing hydroxyaluminumphthalocyanine of the invention and prior-art hydroxyaluminumphthalocyanine, the position of certain deformation bands can be considered. For hydroxyaluminumphthalocyanine of the invention, these exist at 1081 and 574 cm$^{-1}$. In the prior forms of hydroxyaluminumphthalocyanine, these bands are shifted to the frequencies of 1064 and 610 cm$^{-1}$.

EXAMPLE 2

Other Solvent Treatments

The following solvents were used in place of piperidine in the treatment of purified hydroxyaluminumphthalocyanine prepared as in Example 1. Treatments were performed at the reflux temperature of the solvent or at 100° C., whichever was lower.

| | |
| --- | --- |
| ethyl acetate | α-chloronaphthalene |
| toluene | dioxane |
| dimethylformamide | 1,2-dichloroethane |
| acetonitrile | 2-butanone |
| nitromethane | 4-butyrolactone |
| heptane | pyridine |
| methanol | N—methylpyrrolidinone |
| aniline | dimethylsulfoxide |

Crystal structures and spectral absorptions of hydroxyaluminumphthalocyanine treated with each of the above solvents were substantially the same as the piperidine-treated material of Example 1.

EXAMPLE 3

Temperature Effects

To determine temperature effects, if any, on the solvent treatment of purified hydroxyaluminumphthalocyanine, the following solvents were evaluated for solvent treatment of purified hydroxyaluminumphthalocyanine at room temperature for 5 hr, in place of the higher temperatures employed in Example 2:

| Solvents | |
| --- | --- |
| dimethylformamide | methanol |
| dimethylsulfoxide | N—methylpyrrolidinone |

Each of the treatments with the above solvents resulted in hydroxyaluminumphthalocyanine with a crystal structure and absorption substantially the same as the piperidine-treated hydroxyaluminumphthalocyanine of Example 1.

EXAMPLE 4

Photoelectrophoretic Dispersion

Piperidine-treated HAP as in Example 1 was tested for electrical photosensitivity in a liquid migration imaging dispersion, according to the procedures of U.S. Pat. No. 4,146,707. Samples from the images obtained were subjected to a 7-day, high-intensity daylight, 50,000-lux, fading test. The images were very good and no image fading was observed after the 7-day fading test.

EXAMPLE 5

Electrographic Toner

Electrographic toners were prepared from pyridine-treated hydroxyaluminumphthalocyanine by first milling the pigment with steel balls for several days. The pigment was dispersed in a chlorinated fluid, initially 1,1,1-trichloroethylene and was then compounded into a styrene-acrylic binder on a 2-roll rubber mill where the solvent evaporated. The toner was then ground to a particle size of 5–15 microns on a fluid energy mill. Toners of cyan hue for use in electroscopic developers were obtained.

We claim:

1. A migraton imaging dispersion comprising the hydroxyaluminumphthalocyanine of as an electrically photosensitive colorant.

2. Hydroxyaluminumphthalocyanine which exhibits a reflection spectral absorption peak at 621 nm when coated from a dispersion on a reflective support comprising, in sequence, a cellulose acetate layer, a polyurethane layer containing dispersed titanium dioxide and a polyester support.

3. Hydroxyaluminumphthalocyanine as in claim 2 wherein the width of the absorption peak at 621 nm is no more than 100 nm at half-maximum intensity.

4. An electrographic developer composition comprising the hydroxyaluminumphthalocyanine of claim 2 and 3 as a toner colorant.

5. An hydroxyaluminumphthalocyanine having diffraction angles, as determined by Cu K-$\alpha$ X-ray diffraction analysis, of 29.60, 28.78, 27.85, 25.75, 23.85, 22.00, 15.40, 13.80, 11.80, 9.70 and 6.68 degrees.

6. A method of preparing hydroxyaluminumphthalocyanine having reduced green absorption comprising treating hydroxyaluminumphthalocyanine with an organic liquid selected from the group consisting of piperidine, ethyl acetate, $\alpha$-chloronaphthalene, toluene, dioxane, dimethylformamide, 1,2-dichloroethane, acetonitrile, 2-butanone, nitromethane, 4-butyrolactone, heptane, pyridine, methanol, N-methylpyrrolidinone, aniline and dimethylsulfoxide at a temperature from about 20° C. to about 100° C., or the refluxing temperature of said organic liquid, whichever is less.

7. Hydroxyaluminumphthalocyanine prepared according to the process of claim 6.

* * * * *